(12) United States Patent
Wong et al.

(10) Patent No.: US 6,172,141 B1
(45) Date of Patent: Jan. 9, 2001

(54) REWORKABLE EPOXY UNDERFILL ENCAPSULANTS

(75) Inventors: Ching-Ping Wong, Duluth; Lejun Wang, Atlanta, both of GA (US)

(73) Assignee: Georgia Tech Research Corporation, Atlanta, GA (US)

( * ) Notice: Under 35 U.S.C. 154(b), the term of this patent shall be extended for 0 days.

(21) Appl. No.: 09/226,876

(22) Filed: Jan. 7, 1999

Related U.S. Application Data

(60) Provisional application No. 60/070,621, filed on Jan. 7, 1998.

(51) Int. Cl.[7] ............................... C08K 5/20; C08L 63/02
(52) U.S. Cl. ........................ 523/455; 523/461; 523/466
(58) Field of Search ................................ 523/466, 455, 523/461

(56) References Cited

U.S. PATENT DOCUMENTS

| 5,371,328 | 12/1994 | Gutierrez et al. .................... 174/261 |
| 5,560,934 | 10/1996 | Afzali-Ardakani et al. ......... 424/497 |
| 5,659,203 | 8/1997 | Call et al. ............................ 257/778 |
| 5,726,391 | 3/1998 | Iyer et al. ........................... 174/52.2 |
| 5,760,337 | 6/1998 | Iyer et al. ........................... 174/52.2 |
| 5,821,456 | * 10/1998 | Wille et al. ......................... 174/52.2 |

OTHER PUBLICATIONS

Union Carbide Cycloaliphatic Epoxides for Electrical and Electronic Applications, p. 1–3, 1988.*

* cited by examiner

*Primary Examiner*—Robert Dawson
*Assistant Examiner*—D. Aylward

(57) ABSTRACT

A reworkable epoxy underfill encapsulant is provided for use in an electronic packaged system which incorporates an integrated circuit, an organic printed wire board, and at least one eutectic solder joint formed therebetween. A preferred embodiment of the encapsulant includes: a cycloaliphatic diepoxide; an organic hardener; a curing accelerator; a silica filler; and an additive, with the additive providing thermal reworkability to the composition. A method is also provided for forming the aforementioned reworkable epoxy underfill encapsulants.

21 Claims, 1 Drawing Sheet

REWORKABLE EPOXY UNDERFILL ENCAPSULANTS

This application is based on and claims priority to U.S. Provisional Application Serial No. 60/070,621, filed on Jan. 7, 1998.

BACKGROUND OF THE INVENTION

1. Field of the Invention

The present invention relates to thermally reworkable compositions and, in particular, to thermally reworkable epoxy compositions which are adapted for use as flip-chip underfill encapsulants.

2. Description of the Related Art

In the field of electronic packaging and, in particular, the field of integrated circuit (IC) chip interconnection, the desirability of incorporating high input/output (I/O) capability and short IC interconnects, among others, typically has led to the adoption of the flip-chip technique of IC chip interconnection. Generally, the flip-chip technique involves electrically interconnecting an IC chip and a substrate with the use of solder joints which are disposed between the IC chip and the substrate.

As initially practiced, the flip-chip technique oftentimes utilized relatively high cost materials, such as high lead solder and ceramic substrate. However, the desire to reduce costs has prompted the use of less expensive materials, such as flip-chip on board (FCOB), which typically utilizes eutectic solder and organic printed wiring board (PWB). While reducing material costs, the use of FCOB packaged systems has accentuated the problem of coefficient of thermal expansion (CTE) mismatch between the IC chip and the organic substrate of the FCOB, particularly when large IC chips and fine pitch, low profile solder joints are utilized. Due to the CTE mismatch between silicon IC chips (2.5 ppm/° C.) and organic substrates, i.e., FR-4 PWB (18–24 ppm/° C.), temperature cycle excursions experienced by the FCOB generate tremendous thermo-mechanical stress at the solder joints and, subsequently, can result in performance degradation of the packaged system.

It is also known in the prior art to fill the spaces or gaps remaining between an IC chip and substrate which are not occupied by solder with an underfill composition or encapsulant. The encapsulant is an adhesive, such as a resin, that serves to reinforce the physical and mechanical properties of the solder joints between the IC chip and the substrate. The encapsulant typically not only provides fatigue life enhancement of a packaged system, but also provides corrosion protection to the IC chip by sealing the electrical interconnections of the IC chip from moisture, oftentimes resulting in an improvement in fatigue life of ten to over one hundred fold, as compared to an un-encapsulated packaged system.

Heretofore, cycloaliphatic epoxies, typically combined with organic acid anhydrides as a hardener, have been used in flip-chip packaged systems as an encapsulant. This is primarily due to the low viscosity of cycloaliphatic epoxies prior to curing, as well as their acceptable adhesion properties after curing. Additionally, silica has been utilized as a filler in these encapsulant formulations, i.e., up to 70% (by weight), in order to lower the CTE of the epoxy resin. By way of example, the material properties represented in Table 1 typically are exhibited by a prior art epoxy encapsulant composition.

TABLE 1

Typical Material Properties of Epoxy Encapsulants

| | |
|---|---|
| Solids Content | 100% |
| Form | Single component, pre-mixed |
| Coefficient of Thermal Expansion ($\alpha_1$) | 22–27 ppm/° C. |
| Tg | >125° C. |
| Cure Temperature | <165° C. |
| Cure Time | <30 min. |
| Working Life (@ 25° C., visc. double) | >16 hrs. |
| Viscosity (@ 25° C.) | <20 kcps |
| Filler Size | 95% < 15 $\mu$m |
| Filler Content | <70 wt % |
| Alpha Particle Emission | <0.005 counts/cm$^2$/hr. |
| Hardness (Shore D) | >85 |
| Modulus | 6–8 GPa |
| Fracture Toughness | >1.3 Mpa-m$^{1/2}$ |
| Volume Resistivity (@ 25° C.) | >10$^{13}$ ohm-cm |
| Dielectric Constant (@ 25° C.) | <4.0 |
| Dissipation Factor (@ 25° C., 1 khz) | <0.005 |
| Extractable Ions (e.g. Cl, Na, K, Fe, etc.) | <20 ppm total |
| Moisture Absorption (8 hrs. boiling water) | <0.25% |

Although the aforementioned epoxy encapsulants typically possess suitable material properties for use in flip-chip packaged systems, their intractability after curing poses a problem. In particular, once an epoxy encapsulant has cured between an IC chip and a substrate, for instance, it is extremely difficult to rework the epoxy encapsulant, thereby allowing removal of the IC chip from the substrate. Therefore, it has heretofore been desirable to form encapsulants which are reworkable under certain conditions. Several alternative prior art approaches for addressing reworkability are discussed hereinafter.

Development of reworkable encapsulants generally can be classified in two categories: chemically reworkable encapsulants and thermally reworkable encapsulants. In the category of chemically reworkable encapsulants, U.S. Pat. No. 5,560,934, issued to Afzali-Ardakani et al., discloses epoxy compositions that are soluble in an organic acid after curing. Utilizing relatively strong chemicals such as acids (or bases) during reworking, however, oftentimes leads to a messy, time-consuming rework process. Additionally, it has been found that the use of chemicals during the rework process typically makes localized repair of a packaged system difficult and, sometimes, impossible. Therefore, it is believed that thermally reworkable materials offer the possibility of a relatively quick, clean, and localized rework process.

For example, U.S. Pat. No. 5,659,203, issued to Call et al., discloses a reworkable flip-chip module utilizing a specially defined thermoplastic resin as an encapsulant. The thermoplastic resin, such as polysulfone, polyetherimide, etc., possesses a high glass transition temperature (Tg), e.g., 120° C.<Tg<220° C., and must be either dissolved in a solvent or heated above its melting point during the encapsulation process. Therefore, use of these thermoplastic resins as encapsulants for FCOB applications may be undesirable, since such applications typically require an encapsulant which is free of solvent and in liquid form during the encapsulation process, and typically require keeping the packaged system at lower temperatures in order to maintain the integrity of the eutectic solder which is utilized with the organic PWB.

Additionally, U.S. Pat No. 5,371,328, issued to Gutierrez et al., discloses a reworkable flip-chip type of circuit module using a non-stick release coating on all surfaces intermediate of the chip and the substrate. The use of a release coating, however, potentially reduces the strength of the adhesions at all of the material interfaces, including the encapsulant to chip and the encapsulant to substrate interfaces. Since it is known in the prior art that the adhesions of these interfaces are critical to the reliability of the module, the introduction of the non-stick release coating may affect the reliability of the circuit module.

Therefore, there is a need to provide an improved encapsulant which addresses these and other shortcomings of the prior art.

BRIEF SUMMARY OF THE INVENTION

The present invention is generally directed to thermally reworkable epoxy compositions. Preferred embodiments of the composition are adapted for use as flip-chip underfill encapsulants, such as for use in an electronic packaged system which incorporates an integrated circuit, an organic printed wire board and at least one eutectic solder joint formed therebetween. These embodiments include: a cycloaliphatic diepoxide; an organic hardener; a curing accelerator; a silica filler, and; an additive, with the additive providing thermal reworkability to the composition.

In accordance with an aspect of the present invention, the additive provides thermal reworkability to the composition by emitting gas into the epoxy matrix of the composition by decomposing at a temperature of at least approximately 125° C. In preferred embodiments, the additive comprises at least one of the group consisting of: p-toluenesulfonyl semicarbazide, azodicarbonamide, 5-phenyl-3,6-dihydro-1,3,4-oxadiazin-2-one, diisopropylhydrazodicarboxylate, and 5-phenyltetrazole.

In accordance with another aspect of the present invention, the organic hardener is selected from the group consisting of: hexahydrophthalic anhydride, methyl hexahydrophthalic anhydride, methyl-5-norbornene-2,3-dicarboxylic anhydride, tetrahydrophthalic anhydride, methyl tetrahydrophthalic anhydride, and nadic methyl anhydride.

In accordance with another aspect of the present invention, the cycloaliphatic diepoxide comprises at least one of the group consisting of: vinyl cyclohexane diepoxide, 3,4-epoxycyclohexylmethyl-3,4-epoxycyclohexane carboxylate, and bis(3,4-epoxycyclohexylmethyl) adipate.

In accordance with still another aspect of the present invention, the curing accelerator is selected from the group consisting of: triphenylphosphine, 2-ethyl-4-methyl imidazole, 1-(2-cyanoethyl)-2-ethyl-4-methylimidazole, imidazole, 1-methylimidazole, 1-benylimidazole, 1,2-dimethylimidazole, 1-benzyl-2-methylimidazole, 4-methyl-2-phenylimidazole, benzyldimethylamine, triethylamine, pyridine, dimethylaminopyridine, 1,4-diazabicyclo[2.2.2.] octane, 1,8-diazabicyclo[5.4.0]undec-7-ene, and 1,5-diazabicyclo[4.3.0]non-5-ene.

In accordance with a method aspect of the present invention, a preferred method of forming a thermally reworkable epoxy compound includes the steps of: in 50 parts by weight of cycloaliphatic epoxy: adding 20 to 80 parts by weight, preferably 40 to 60 parts by weight, of an organic hardener; adding 0.2 to 5 parts by weight, preferably 2 to 4 parts by weight, of a curing accelerator; adding 1 to 30 parts by weight, preferably 2.5 to 10 parts by weight, of an additive; and adding 100 to 400 parts of a silica filler, with the additive providing thermal reworkability to the composition.

Other features and advantages of the present invention will become apparent to one with skill in the art upon examination of the following drawing and detailed description. It is intended that all such additional features and advantages be included herein within the scope of the present invention, as defined by the claims.

BRIEF DESCRIPTION OF THE SEVERAL VIEWS OF THE DRAWINGS

The accompanying drawing incorporated in and forming a part of the specification, illustrates several aspects of the present invention, and together with the description serve to explain the principles of the invention. In the drawing.

DETAILED DESCRIPTION OF THE PREFERRED EMBODIMENT

Figure 1:
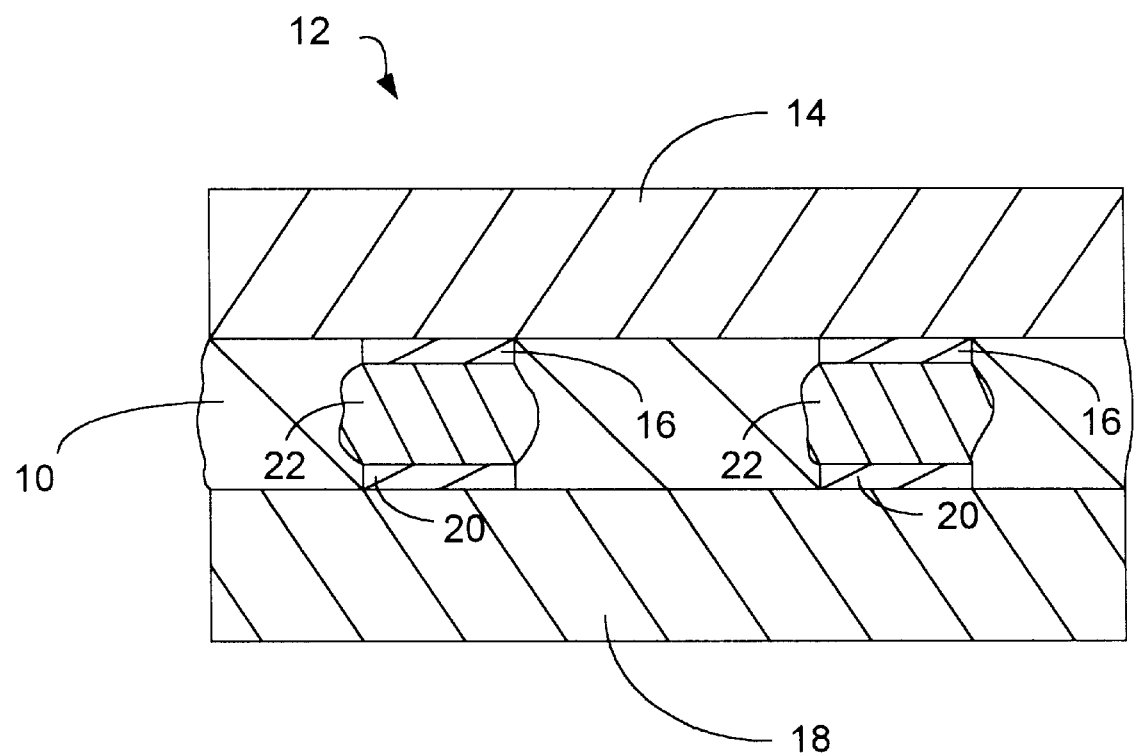
FIG. 1 is a cross-sectional view of a representative IC-substrate package system formed in accordance with a flip-chip technique.

The invention is illustrated in FIG. 1. While the invention will be described in connection with FIG. 1, there is no intent to limit it to the embodiment disclosed therein. On the contrary, the intent is to cover all alternatives, modifications and equivalents included within the spirit and scope of the invention as defined by the appended claims.

Referring to FIG. 1, the encapsulant 10 of the present invention typically is incorporated into an electrical component 12 which preferably is formed in accordance with a flip-chip technique. As shown in FIG. 1, the electrical component 12 includes an integrated circuit chip 14 with conductors 16 formed on its lower surface, and a substrate 18, preferably an organic printed wiring board (PWB). Conductors 16 typically are aligned with substrate conductors 20 which are arranged on the upper surface of the substrate. Solder joints 22, preferably formed of eutectic solder, are disposed between conductors 16 and 20 in a known manner, thereby electrically interconnecting chip 14 and substrate 18.

The encapsulant 10 of the present invention incorporates one or more additives which have been found to impart the desired characteristic of thermal reworkability into known yet, heretofore, un-reworkable epoxy encapsulant formulations. These additives, commonly known as chemical blowing agents or chemical foaming agents, decompose at specified temperature regions. Once decomposed, each of these additives emit a relatively large volume of gas; a feature which has been discovered to be particularly useful in providing thermal reworkability to encapsulants.

The reason that these additives provide reworkability to the encapsulant is directly due to their gas-emitting feature. Once embedded into the epoxy matrix of the encapsulant, as the temperature of the encapsulant reaches the decomposition temperature of the additive, the additive starts to decompose. As the additive decomposes, it emits gases which cause the encapsulant CTE to increase. This increase in encapsulant CTE makes the IC chip, i.e. chip 14 (FIG. 1), which was initially strongly bonded to the substrate by the encapsulant, removable from the substrate. Additionally, the gas-emitting feature of the additive tends to generate voids within the epoxy matrix of the encapsulant, thereby allowing residual encapsulant remaining on any of the components, such as chip or the substrate, to be removed with solvent in a known manner.

In preferred embodiments of the encapsulant 10, the additive should possess the following criteria: (1) the additive should be sufficiently stable to permit the epoxy matrix of the encapsulant to perform its intended function in a specific application; (2) the additive should be substantially inert to the curing reaction of the encapsulant; (3) the additive should not adversely affect the overall material properties of the encapsulant; and (4) the additive preferably should cause a rapid and dramatic change to the properties of the encapsulant under specific temperatures, so that the encapsulant can be reworked under controlled conditions.

Based on the criteria set forth hereinbefore, preferred embodiments of the encapsulant 10 do not incorporate additives with a decomposition temperature lower than approximately 125° C., because typical epoxy encapsulants cure at or near this temperature. The aforementioned criteria also eliminate additives that, by reacting with other components of the encapsulant, either interfere with encapsulant curing or experience a loss in their gas-emitting characteristics. Based on our studies, several additives have been identified which meet the aforementioned criteria, these additives include: p-toluenesulfonyl semicarbazide, azodicarbonamide, 5-phenyl-3,6-dihydro-1,3,4-oxadiazin-2-one, diisopropylhydrazodicarboxylate, and 5-phenyltetrazole.

The following illustrative embodiments of a reworkable epoxy encapsulant formulation are provided:

EXAMPLE 1

This example discloses the composition of a preferred reworkable epoxy encapsulant formulation. To form the composition, 3,4-epoxycyclohexylmethyl-3,4-epoxycyclohexane carboxylate (100 parts by weight) was mixed with 100 parts of methyl hexahydrophthalic anhydride and with 8 parts of 2-ethyl-4-methyl imidazole. The mixture was stirred at room temperature until becoming homogeneous. This mixture was mechanically mixed with 10 parts of p-toluenesulfonyl semicarbazide and 500 parts of silica filler (average particle size 15 μm) until uniformly mixed. It was determined, as discussed in greater detail hereinafter, that the mixture was reworkable.

For purposes of comparison, a second mixture was prepared in accordance with the aforementioned procedure, except that the step of adding p-toluenesulfonyl semicarbazide was omitted. It was determined, as discussed in greater detail hereinafter, that the second mixture was non-reworkable.

The following tests were conducted:

Test 1

This test provided curing studies of the two mixtures described in example 1. A DSC run (5° C./min. ramping) of the first (reworkable) mixture had a similar exotherm to that of the second (non-reworkable) mixture. DSC results also showed that both mixtures had similar Tg, which was approximately 170° C.

Test 2

This test provided adhesion studies of the mixtures described in example 1. The adhesion strengths of two mixtures to alumina substrate and silicon die were measured in shear mode using a bond tester. The die was 80×80 mil passivated with silicon nitride. Both the die and the alumina substrate were cleaned prior to testing. The curing condition for the mixtures was 125° C./60min. The adhesion strength of the reworkable mixture was similar to that of the non-reworkable mixture.

Test 3

This test provided curing of the two mixtures described in example 1. Each mixture was cured in a convection oven at 125° C. for 60 minutes.

Test 4

This test provided Thermal-Mechanical Analyzer (TMA) studies of the cured mixtures described in test 3. The CTE of the reworkable mixture below Tg was approximately 27 ppm/° C., which was similar to that of the non-reworkable mixture. The CTE of the reworkable mixture dramatically increased at approximately 200° C., while no change of the CTE of the non-reworkable mixture was noted.

Test 5

This test provided Dynamic Mechanical Analyzer (DMA) studies of the mixtures described in test 3. The storage modulus of the reworkable mixture at room temperature was approximately 7 GPa, as was that of the non-reworkable mixture.

Test 6

This test involved making test vehicles for reworkability testing. About 20 mg of the each mixture as described in example 1 was put on the surface of a pre-cleaned pure FR-4 substrate. Then a piece of pre-cleaned silicon die was put on the mixture. Some force was applied on the die so that the mixture filled the entire gap between the die and the substrate. The assembly was gassed under moderate vacuum for 30 min, then cured in a convection oven at 125° C. for 60 minutes.

Test 7

In this test, two test vehicles described in test 6 were put on a hot plate which had been preset to 200° C. The test vehicle with the reworkable mixture showed quick delamination between the substrate and the die, while there was almost no delamination on the test vehicle with the non-reworkable mixture. After the test vehicles were put on the hot plate for two minutes. The silicon die could easily be removed by tweezers from the substrate utilizing the reworkable mixture; however, the silicon die could not be removed by tweezers from the substrate utilizing the non-reworkable mixture. After removal of the silicon die from the substrate utilizing the reworkable mixture, reworkable mixture residue left on the substrate was removed by DMSO (dimethyl sulfone) at 90° C.

EXAMPLE 2

This example discloses the composition of an alternative reworkable epoxy encapsulant formulation. To form the composition, 3,4-epoxycyclohexylmethyl-3,4-epoxycyclohexane carboxylate (100 parts by weight) was mixed with 100 parts of methyl hexahydrophthalic anhydride and with 8 parts of 2-ethyl-4-methyl imidazole. The mixture was stirred at room temperature until it became homogeneous. This mixture was mechanically mixed with 10 parts of 5-phenyltetrazole and 500 parts of silica filler (average particle size 15 μm) until uniformly mixed. The mixture was cured in a convection oven at 165° C. for 30 minutes.

EXAMPLE 3

This example discloses a composition which incorporates an additive that loses its gas-emitting feature after mixing with the epoxy components. This composition is, therefore, considered unacceptable. To form the composition, 3,4-epoxycyclohexylmethyl-3,4-epoxycyclohexane carboxylate (100 parts by weight) was mixed with 100 parts of methyl hexahydrophthalic anhydride and with 8 parts of 2-ethyl-4-methyl imidazole. The mixture was stirred at room temperature until it became homogeneous. Then this mixture was mechanically mixed with 10 parts of 4-4'-oxybissulfonyl hydrazide and 500 parts of silica filler (average particle size 15 μm) until uniformly mixed. The mixture was cured in a convection oven at 125° C. for 60 minutes.

The cured mixture was put on a hot plate with its temperature slowly increased starting from room temperature. This cured mixture did not show any gas generation, even when the temperature reached 250° C. This occurred even though 4-4'-oxybissulfonyl hydrazide has a decomposition temperature of approximately 160° C.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention, as determined by the appended claims when interpreted in accordance with the breadth to which they are fairly and legally entitled.

What is claimed is:

1. An epoxy composition for use in an electronic packaged system, the packaged system having an integrated circuit, an organic printed wire board and at least one eutectic solder joint formed therebetween, said composition comprising:
    a cycloaliphatic diepoxide;
    an organic hardener;
    a curing accelerator;
    a silica filler; and
    an additive such that said additive provides thermal reworkability to said composition.

2. The epoxy composition of claim 1, wherein said organic hardener is an organic carboxylic acid anhydride hardener.

3. The epoxy composition of claim 1, wherein said epoxy composition has an epoxy matrix and said additive provides thermal reworkability to said composition by emitting gas into said epoxy matrix.

4. The epoxy composition of claim 1, wherein said epoxy composition has an epoxy matrix and said additive provides thermal reworkability to said composition by decomposing at a temperature of at least approximately 125° C.

5. The epoxy composition of claim 1, wherein said additive comprises at least one of the group consisting of: p-toluenesulfonyl semicarbazide, azodicarbonamide, 5-phenyl-3,6-dihydro-1,3,4-oxadiazin-2-one, diisopropylhydrazodicarboxylate, and 5-phenyltetrazole.

6. The epoxy composition of claim 1, wherein said organic hardener is selected from the group consisting of: hexahydrophthalic anhydride, methyl hexahydrophthalic anhydride, methyl-5-norbornene-2,3-dicarboxylic anhydride, tetrahydrophthalic anhydride, methyl tetrahydrophthalic anhydride, and nadic methyl anhydride.

7. The epoxy composition of claim 1, wherein said cycloaliphatic diepoxide comprises at least one of the group consisting of: vinyl cyclohexane diepoxide, 3,4-epoxycyclohexylmethyl-3,4-epoxycyclohexane carboxylate, and bis(3,4-epoxycyclohexylmethyl)adipate.

8. The epoxy composition of claim 1, wherein said curing accelerator is selected from the group consisting of: triphenylphosphine, 2-ethyl-4-methyl imidazole, 1-(2-cyanoethyl)-2-ethyl-4-methylimidazole, imidazole, 1-methylimidazole, 1-benylimidazole, 1,2-dimethylimidazole, 1-benzyl-2-methylimidazole, 4-methyl-2-phenylimidazole, benzyldimethylamine, triethylamine, pyridine, dimethylaminopyridine, 1,4-diazabicyclo[2.2.2.]octane, 1,8-diazabicyclo[5.4.0]undec-7-ene, and 1,5-diazabicyclo[4.3.0]non-5-ene.

9. A method of forming a thermally reworkable epoxy compound, comprising the steps of:
    in 50 parts by weight of cycloaliphatic epoxy, adding 20 to 80 parts of an organic hardener;
    adding 0.2 to 5 parts by weight of a curing accelerator;
    adding 1 to 30 parts by weight of an additive; and
    adding 100 to 400 parts of a silica filler,
    wherein said additive provides thermal reworkability to said composition.

10. The method of claim 9, wherein the step of adding 20 to 80 parts of an organic hardener is further defined as adding 40 to 60 parts of an organic carboxylic acid anhydride hardener.

11. The method of claim 9, wherein the step of adding 0.2 to 5 parts by weight of a curing accelerator is further defined as adding 2 to 4 parts of said curing accelerator.

12. The method of claim 9, wherein the step of adding 1 to 30 parts by weight of an additive is further defined as adding 2.5 to 10 parts of said additive.

13. The method of claim 9, wherein said epoxy composition has an epoxy matrix and said additive provides thermal reworkability to said composition by emitting gas into epoxy matrix.

14. The method of claim 9, wherein said epoxy composition has an epoxy matrix and said additive provides thermal reworkability to said composition by decomposing at a temperature of at least approximately 125° C.

15. The method of claim 9, wherein said additive comprises at least one of the group consisting of: p-toluenesulfonyl semicarbazide, azodicarbonamide, 5-phenyl-3,6-dihydro-1,3,4-oxadiazin-2-one, diisopropylhydrazodicarboxylate, and 5-phenyltetrazole.

16. The method of claim 9, wherein said organic hardener is selected from the group consisting of: hexahydrophthalic anhydride, methyl hexahydrophthalic anhydride, methyl-5-norbornene-2,3-dicarboxylic anhydride, tetrahydrophthalic anhydride, methyl tetrahydrophthalic anhydride, and nadic methyl anhydride.

17. The method of claim 9, wherein said cycloaliphatic diepoxide comprises at least one of the group consisting of: vinyl cyclohexane diepoxide, 3,4-epoxycyclohexylmethyl-3,4-epoxycyclohexane carboxylate, and bis(3,4-epoxycyclohexylmethyl) adipate.

18. The method of claim 9, wherein said curing accelerator is selected from the group consisting of: triphenylphosphine, 2-ethyl-4-methyl imidazole, 1-(2-cyanoethyl)-2-ethyl-4-methylimidazole, imidazole, 1-methylimidazole, 1-benylimidazole, 1,2-dimethylimidazole, 1-benzyl-2-methylimidazole, 4-methyl-2-phenylimidazole, benzyldimethylamine, triethylamine, pyridine, dimethylaminopyridine, 1,4-diazabicyclo[2.2.2.]octane, 1, 8-diazabicyclo[5.4. 0]undec-7-ene, and 1,5-diazabicyclo[4.3.0]non-5-ene.

19. An epoxy composition comprising:
    a cycloaliphatic diepoxide;
    an organic hardener;
    a curing accelerator;
    a filler; and
    an additive such that said additive provides thermal reworkability to said composition.

20. The epoxy composition of claim 19, wherein said epoxy composition has an epoxy matrix and said additive provides thermal reworkability to said composition by emitting gas into said epoxy matrix by decomposing at a temperature of at least approximately 125° C.

21. The epoxy composition of claim 20, wherein:
   said cycloaliphatic diepoxide comprises at least one of the group consisting of: vinyl cyclohexane diepoxide, 3,4-epoxycyclohexylmethyl-3,4-epoxycyclohexane carboxylate, and bis(3,4-epoxycyclohexylmethyl) adipate;
   said organic hardener is selected from the group consisting of: hexahydrophthalic anhydride, methyl hexahydrophthalic anhydride, methyl-5-norbornene-2,3-dicarboxylic anhydride, tetrahydrophthalic anhydride, methyl tetrahydrophthalic anhydride, and nadic methyl anhydride;
   said curing accelerator is selected from the group consisting of: triphenylphosphine, 2-ethyl-4-methyl imidazole, 1-(2-cyanoethyl)-2-ethyl-4-methylimidazole, imidazole, 1-methylimidazole, 1-benylimidazole, 1,2-dimethylimidazole, 1-benzyl-2-methylimidazole, 4-methyl-2-phenylimidazole, benzyldimethylamine, triethylamine, pyridine, dimethylaminopyridine, 1,4-diazabicyclo[2.2.2.]octane, 1,8-diazabicyclo[5.4.0]undec-7-ene, and 1,5-diazabicyclo[4.3.0]non-5-ene;
   said filler is silica; and
   said additive comprises at least one of the group consisting of: p-toluenesulfonyl semicarbazide, azodicarbonamide, 5-phenyl-3,6-dihydro- 1,3,4-oxadiazin-2-one, diisopropylhydrazodicarboxylate, and 5-phenyltetrazole.

* * * * *

UNITED STATES PATENT AND TRADEMARK OFFICE
CERTIFICATE OF CORRECTION

PATENT NO. : 6,172,141 B1
DATED : January 9, 2001
INVENTOR(S) : Ching-Ping Wong and Lejun Wang It is certified that error appears in the above-identified patent and that said Letters Patent is hereby corrected as shown below:

Column 3, line 51, delete "1-benylimidazole" and replace with --1-benzylimidazole--.

Column 6, line 33, after the word "minutes," delete ". The" and replace with --, the--.

Column 8, line 57, delete "[2.2.2.]" and replace with --[2.2.2]--.

Column 8, line 58, delete "1, 8-diazabicyclo[5.4. 0]undec-7-ene" and replace with --1,8-diazabicyclo[5.4.0]undec-7-ene--.

Column 10, line 5, delete "1-benylimidazole" and replace with --1-benzylimidazole--.

Signed and Sealed this

Twenty-ninth Day of May, 2001

Attest:

NICHOLAS P. GODICI

*Attesting Officer*   *Acting Director of the United States Patent and Trademark Office*